United States Patent
Liu et al.

(10) Patent No.: US 9,437,186 B1
(45) Date of Patent: Sep. 6, 2016

(54) ENHANCED ENDPOINT DETECTION FOR SPEECH RECOGNITION

(71) Applicant: Amazon Technologies, Inc., Reno, NV (US)

(72) Inventors: Baiyang Liu, Bellevue, WA (US); Hugh Evan Secker-Walker, Newburyport, MA (US); Alexander David Rosen, Somerville, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 241 days.

(21) Appl. No.: 13/921,671

(22) Filed: Jun. 19, 2013

(51) Int. Cl.
*G10L 15/00* (2013.01)
*G10L 15/05* (2013.01)
G10L 15/22 (2006.01)
G10L 15/19 (2013.01)

(52) U.S. Cl.
CPC ............. *G10L 15/05* (2013.01); *G10L 15/00* (2013.01); *G10L 15/19* (2013.01); *G10L 15/22* (2013.01)

(58) Field of Classification Search
CPC ....... G10L 15/05; G10L 15/19; G10L 15/22; G10L 15/00
USPC .................. 704/251, 270, 275, 248, 253, 9, 704/E15.001
See application file for complete search history.

(56) References Cited

U.S. PATENT DOCUMENTS

| | | | | |
|---|---|---|---|---|
| 4,028,496 A * | 6/1977 | LaMarche | ............... | G10L 25/78 379/406.03 |
| 4,410,763 A * | 10/1983 | Strawczynski | ......... | G10L 25/78 704/214 |
| 5,295,190 A * | 3/1994 | Yamashita | ............. | G10L 25/87 704/239 |
| 5,457,768 A * | 10/1995 | Tsuboi | .................... | G10L 15/18 704/219 |
| 5,794,195 A * | 8/1998 | Hormann | ................ | G10L 15/05 704/233 |
| 6,044,342 A * | 3/2000 | Sato | ......................... | G10L 25/78 704/233 |
| 6,782,363 B2 * | 8/2004 | Lee | ........................... | G10L 25/87 704/210 |
| 6,873,953 B1 * | 3/2005 | Lennig | .................... | G10L 25/87 704/248 |
| 7,412,376 B2 * | 8/2008 | Florencio | ............... | G10L 25/87 370/470 |
| 2002/0128816 A1 * | 9/2002 | Haug et al. | ........................ | 704/4 |
| 2002/0147581 A1 * | 10/2002 | Shriberg | ................ | G10L 25/87 704/207 |
| 2004/0243393 A1 * | 12/2004 | Wang | ...................... | G10L 15/22 704/9 |
| 2007/0185717 A1 * | 8/2007 | Bennett | ...................... | 704/270.1 |
| 2008/0172225 A1 * | 7/2008 | Kim | ........................ | G10L 25/87 704/233 |
| 2010/0312557 A1 * | 12/2010 | Strom | ................... | G10L 15/065 704/246 |
| 2011/0313764 A1 * | 12/2011 | Bacchiani | .............. | G10L 15/32 704/235 |
| 2012/0191455 A1 * | 7/2012 | Bou-Ghazale | ......... | G10L 25/87 704/248 |

* cited by examiner

*Primary Examiner* — Pierre-Louis Desir
*Assistant Examiner* — Forrest F Tzeng
(74) *Attorney, Agent, or Firm* — Seyfarth Shaw LLP; Ilan N. Barzilay; Cyrus A. Miller

(57) ABSTRACT

Determining the end of an utterance for purposes of automatic speech recognition (ASR) may be improved with a system that provides early results and/or incorporates semantic tagging. Early ASR results of an incoming utterance may be prepared based at least in part on an estimated endpoint and processed by a natural language understanding (NLU) process while final results, based at least in part on a final endpoint, are determined. If the early results match the final results, the early NLU results are already prepared for early execution. The endpoint may also be determined based at least in part on the content of the utterance, as represented by semantic tagging output from ASR processing. If the tagging indicate completion of a logical statement, an endpoint may be declared, or a threshold for silent frames prior to declaring an endpoint may be adjusted.

22 Claims, 8 Drawing Sheets

FIG. 6A  play songs
          ↑      ↑
          P1     P2

FIG. 6B  play songs by Coldplay
          ↑    ↑    ↑        ↑
          P1   P2   P3       P4

FIG. 6C  play songs by Michael
          ↑    ↑    ↑    ↑
          P1   P2   P3   P4

FIG. 6D  play songs by Michael Jackson
          ↑    ↑    ↑    ↑       ↑
          P1   P2   P3   P4      P5

FIG. 6E  next
          ↑
          P1

FIG. 6F  next track
          ↑    ↑
          P1   P2

FIG. 6G  stop
          ↑
          P1

ENHANCED ENDPOINT DETECTION FOR SPEECH RECOGNITION

BACKGROUND

Human-computer interactions have progressed to the point where humans can control computing devices, and provide input to those devices, by speaking Computing devices employ techniques to identify the words spoken by a human user based on the various qualities of a received audio input. Such techniques are called speech recognition or automatic speech recognition (ASR). Speech recognition combined with language processing techniques may allow a user to control a computing device to perform tasks based on the user's spoken commands. Speech recognition may also convert a user's speech into text data which may then be provided to various textual based programs and applications.

Speech recognition may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 6A-6G illustrate training data for implementing enhanced endpointing according to FIG. 2 of the present disclosure.

DETAILED DESCRIPTION

Figure 1:
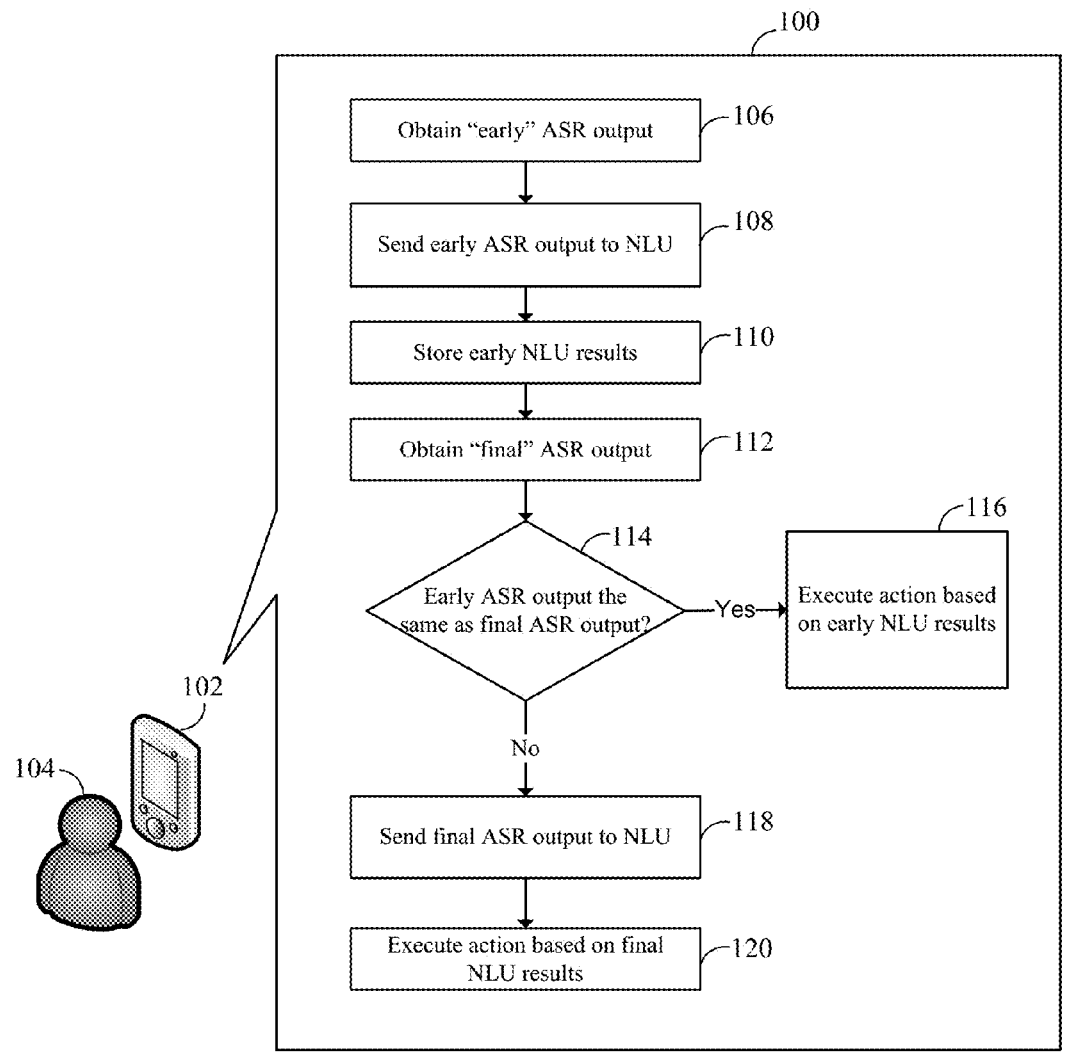
FIG. 1 illustrates an automatic speech recognition method having enhanced endpointing by according to one aspect of the present disclosure.

To improve a user's experience and reduce the time between the end of a user's speech input to a local device and initiation of an action based on the speech input, automatic speech recognition (ASR) systems may be configured to implement enhanced mechanisms to determine the end of a speech utterance ("endpointing") to more quickly and accurately determine the end of the user's speech input or utterance into the local device.

In one aspect of the present disclosure, endpointing may be enhanced by initially implementing speculative or predictive endpointing involving an "early" or speculative endpoint and then a later, "final" endpoint. The speculative, early endpoint may occur at a set time, for example 200 ms, after no speech is detected. That is, after 200 ms of non-speech is detected, the ASR system outputs an early result containing the recognized text and sends it to some downstream component for further operation on the early ASR output. The downstream component, such as a natural language understanding (NLU) module, may then process the early ASR output to achieve early NLU results which are held pending a confirmation of the accuracy of the early ASR output.

At a later time, for example after 400 ms of non-speech is detected, the final endpoint occurs and the ASR system outputs a final ASR output, containing the final recognized text. If the ASR output is the same (or close enough), the early NLU results which were determined earlier may be used to execute an action. If the early ASR output and the final ASR output are not the same, the early NLU results are discarded and the final ASR output is sent to the NLU for processing and then on to a further downstream component and/or device for further action. Thus, in the case where the early ASR output is the same as the final ASR output, the amount of time a user waits for an action (latency) is reduced because the NLU results based on the early ASR output are already completed and available for execution more quickly than they otherwise would have had NLU processing had to wait for the final ASR output.

The downstream component may be any number of components or applications that operate on ASR output. Although many such downstream applications are envisioned for these techniques, for purposes of illustration this description will use an NLU process and application as the NLU process illustrates the benefits of early ASR output as described below. For example, the NLU process may take ASR output and determine, for example, the actions (sometimes referred to as an "application response" or "app response") based on the recognized speech of the early ASR output. The app response based on the early ASR output may not be immediately activated but may be held pending successful comparison of the early ASR output to the final ASR output. If the comparison is successful, then the app response is immediately available for execution (rather than having to wait for NLU processing in a typically staged process), thus improving latency from a user's perspective. This downstream application processing may be referred to as speculative processing as it is being performed in anticipation of ASR output confirmation and may ultimately be discarded if the early ASR output is not confirmed. Such speculative processing is not visible to the user, and the results of the speculative processing only make their way downstream (and possibly ultimately to a user) if the early ASR output is confirmed.

FIG. 1 illustrates the implementation of enhanced endpoint detection involving predictive or speculative endpointing according to one aspect of the disclosure. As illustrated, a speech recognition process 100 may be implemented on a client or local device 102 such as a smart phone or other local device, or the speech recognition process (or portions thereof) may be implemented on a remote server or server(s) such as implemented "in the cloud" (not shown) as part of a distributed computing system. The speech recognition process 100 manages the detection of speech in an audio input, such as speech input from a user 104 speaking into the local device 102. The speech recognition process 100 monitors audio input to determine when the speech utterance ends so that automatic speech recognition (ASR) results can be sent to a downstream component such as to implement actions based on the recognized speech.

As illustrated, a speculative, or early endpoint to the input stream occurs at a set time after no speech is detected, a first non-speech period, and the early ASR output at the early endpoint, at box 106. The early ASR output contains the recognized text before this first non-speech period. The recognized text from the early ASR output is further processed (e.g., sent to a natural language understanding (NLU) module or other post-ASR module) to obtain early speech processing results (e.g., early NLU results) for eventual execution, such as triggering an app response, based on the recognized speech. The early speech processing results (e.g., early NLU results) are not immediately executed, rather they are stored, at box 110. At a later time, the final endpoint occurs after a second non-speech period, and the ASR module provides recognized text in the form of a "final" ASR output, as at box 112. The early ASR output is then compared to the final ASR output, at box 114. If the results are the same (or sufficiently the same), an action may be executed based on the early speech processing results (e.g., early NLU results), at box 116, without having to wait for further processing. If the early ASR output as tested against the final ASR output is not the same, the early ASR output and early speech processing results (e.g., early NLU results) are discarded. The final ASR output is then sent for speech processing at box 118 to determine final speech processing results (e.g., final NLU results). Then an action based on the final speech processing results (e.g., final NLU results) generated from the final ASR output may be executed, at box 120. Thus, the amount of time a user waits for an action (latency) is reduced because the speech processing results are available more quickly than otherwise would occur based on processing of the final ASR output.

In known endpoint detection approaches, a speech endpoint detection algorithm may determine if an utterance has terminated, based on the number of silence/non-speech audio frames, for instance the number of consecutive silence/non-speech frames. Energy based or acoustic model based voice activity detection (VAD) may be used in these algorithms. The utterance may be deemed ended when the voice activity detector sees a certain number of non-speech audio frames. Two issues may arise with this type of algorithm in the application of speech and language understanding. First, the algorithm must wait for the number of non-speech frames to exceed a threshold before terminating the recognition and generating the ASR output. Second, to avoid splitting the speech into many small utterances, a large threshold of non-speech frames may be used to accommodate pauses in the speech pattern. Such a large threshold may lead to more latency than users like.

Using a fixed threshold for the number of non-speech frames before terminating an utterance is problematic, because different users have different pause durations in their speech. No one threshold is ideal for all users. For some users, use of a fixed threshold may combine two utterances into one or split one utterance into two utterances. Either of these cases can lead to larger word error rates and an undesirable user experience.

In a further implementation according to the disclosure, semantic information in the user's speech may be used to help determine the end of an utterance. That is, an ASR processor may be configured so that semantic tags or other indicators may be included as part of the ASR output and used to determine, as the user's speech is recognized, whether the user's utterance has reached a logical stopping point. The amount of time after non-speech is detected until the ASR terminates its processing may be dynamically adjusted based on tags in an ASR model (described below) that provide the semantic information appropriate to more accurately determine the end of an utterance for a given user.

In one aspect of the disclosure, over time, the ASR system may refine the thresholds, wait times, or general weighting to the specific patterns of pauses before ASR processing is started on an utterance for the given user. For a user that pauses for long periods before completing an utterance, the system would adjust thresholds or wait times to be longer. For a user who speaks without many long pauses the system would adjust all thresholds to be shorter. Early or final endpoints, or both, may be adjusted in a system according to the disclosure.

Figure 2:
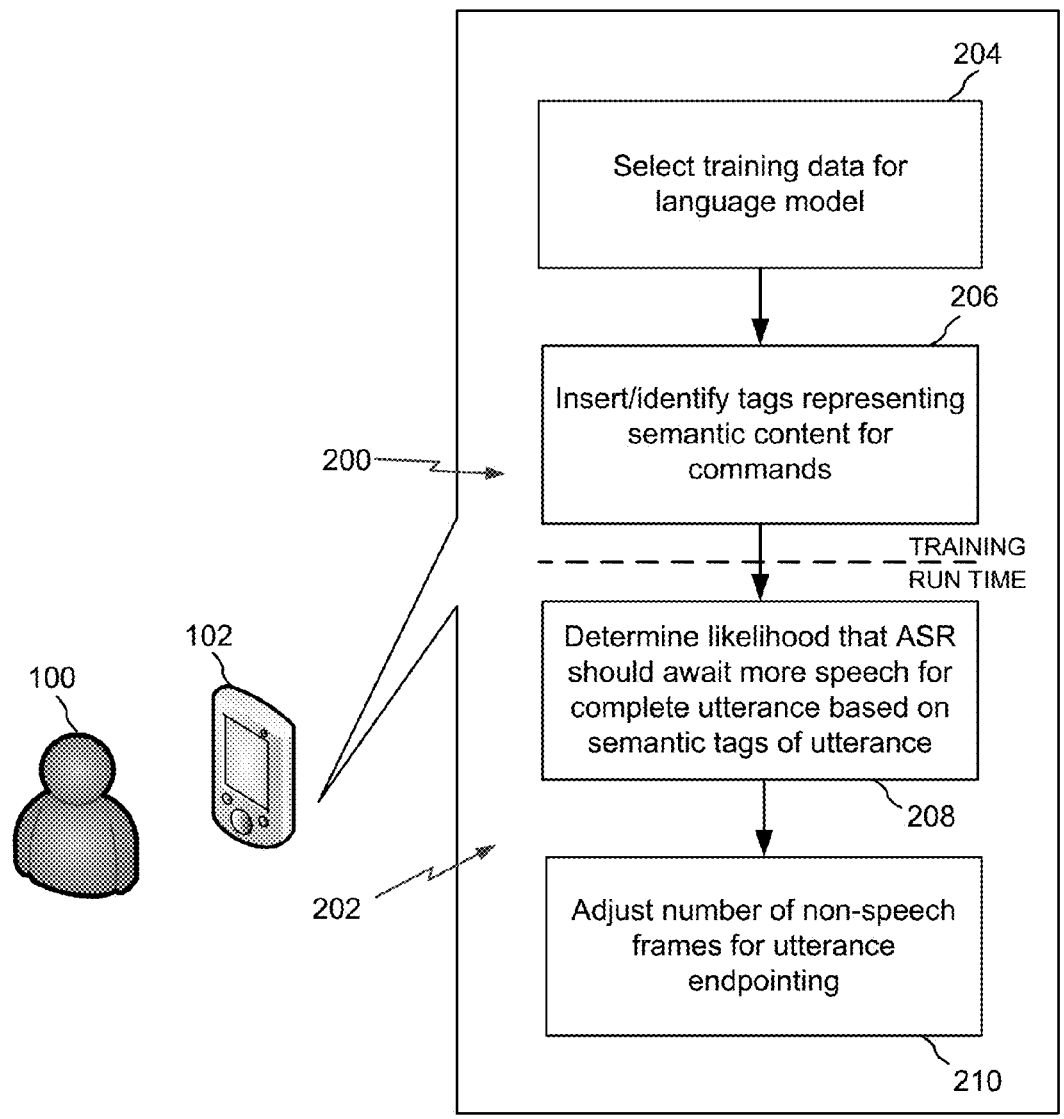
FIG. 2 illustrates an automatic speech recognition method having enhanced endpointing according to a further aspect of the present disclosure.

FIG. 2 generally illustrates a process for implementing enhanced endpoint determination using semantic information to help determine the end of a speech utterance. During a training phase, 200, training data is selected for a language model (described below), 204. Tags representing the length of pauses and semantic content of potential utterances are identified and inserted in the training data for the language model, 206 as described in greater detail below. During run time processing, the language model and sematic tags representing the length of pauses in speech are used to determine the likelihood that the ASR (or NLU) should await more speech before determining the end of the utterance, at 208. Depending on the determination, the number of frames of non-speech that may be processed before the end of the utterance is established is adjusted, 210. The number of non-speech frames determines when the ASR is fired to provide the recognized speech (i.e., ASR output).

Audio detection processing for endpoint determination may be performed by determining an energy level of the audio input. In some embodiments, the endpointing/audio detection may include a low-power digital signal processor (or other type of processor) configured to determine an energy level (such as a volume, intensity, amplitude, etc.) of an obtained audio input and for comparing the energy level of the audio input to an energy level threshold. The energy level threshold may be set according to user input, or may be set by a device. In some embodiments, the endpointing/audio detection may be further configured to determine that the audio input has an energy level satisfying a threshold for at least a threshold duration of time. In such embodiments, high-energy audio inputs of relatively short duration, which may correspond to sudden noises that are relatively unlikely to include speech, may be ignored. The endpointing/audio detection may compare the energy level to the energy level threshold (and optionally to the threshold duration) to determine whether the energy level threshold is met.

If the endpointing/audio detection determines that the obtained audio input has an energy level satisfying an energy level threshold it may process audio input to determine whether the audio input includes speech. In some embodiments, the endpointing/audio detection works in conjunction with digital signal processing to implement one or more techniques to determine whether the audio input includes speech. Some embodiments may apply voice activity detection (VAD) techniques, such as harmonicity detection. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the endpointing/audio detection implements a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models, which acoustic models may include models corresponding to speech, noise (such as environmental noise or background noise), or silence/non-speech. Still other techniques may be used to determine whether speech is present in the audio input.

Using various ones of the techniques described above, the endpointing/audio detection may determine a confidence level whose value corresponds to a likelihood that speech is actually present in the audio input. If the confidence level satisfies a confidence level threshold, it may be determined that speech is present in the audio input. However, if the confidence level does not satisfy the confidence level the endpointing/audio detection may determine that there is no speech in the audio input.

The modules or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The device 102 may include memory such as RAM, ROM, and/or other persistent or non-transitory computer-readable storage media. The device 102 also may include a user interface module (not shown) configured to present a user interface via a display of the device 102. The user interface module may be further configured to process user input received via a user input device (not shown), such as a mouse, keyboard, touchscreen, keypad, etc., as is well known in the art. The user interface presented by the user interface module may provide a user with the opportunity to customize the operation of the device 102 and/or described processes according to the disclosure, and/or other operations implemented by the device 102. The memory may additionally store an operating system that provides computer program instructions for use by the processing unit in the general administration and operation of the device 102. The memory can further include computer program instructions that an application processing module and/or processing unit in the device 102 executes in order to implement one or more embodiments of a speech recognition system with distributed endpointing according to the disclosure. The device 102 may use speech recognition concepts running as computer program instructions on a processing unit in the device 102 to implement endpointing in the device as described above. In some embodiments, the device 102 may further include an automatic speech recognition engine that may be implemented by the processing unit to perform the functionality described with respect to FIGS. 1 and 2 in the device 102.

Figure 3:
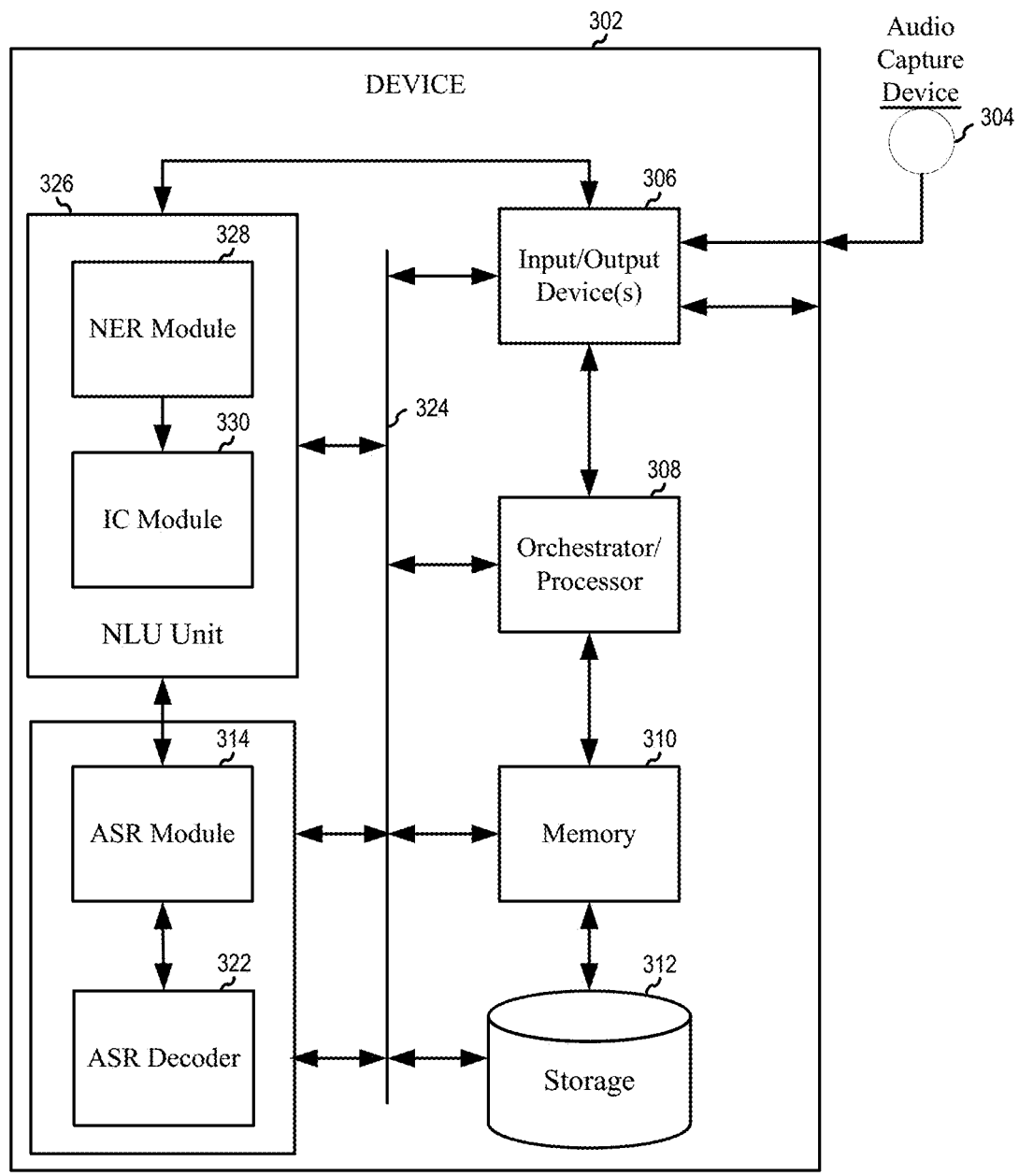
FIG. 3 is a block diagram conceptually illustrating an automated speech recognition device implementing enhanced endpointing according to aspects of the present disclosure.

Referring now to FIG. 3, a system according to the disclosure may comprise an automated speech recognition (ASR) device 302 for implementing the processes described and performing speech recognition. Aspects of the present disclosure include computer-readable and computer-executable instructions that may reside on the ASR device 302. FIG. 3 illustrates a number of components that may be included in the ASR device 302, however other non-illustrated components may also be included. Also, some of the illustrated components may not be present in every device capable of employing aspects of the present disclosure. Further, some components that are illustrated in the ASR device 302 as a single component may also appear multiple times in a single device. For example, the ASR device 302 may include multiple input/output devices 306 or multiple orchestrators/controllers/processors 308.

Multiple ASR devices may be employed in a single speech recognition system. In such a multi-device system, the ASR devices may include different components for performing different aspects of the speech recognition process. The multiple devices may include overlapping components. The ASR device as illustrated in FIG. 3 is exemplary, and may be a stand-alone device or may be included, in whole or in part, as a component of a larger device or system. Further, the various components illustrated in FIG. 3 may be included in a single device or spread across multiple devices.

Figure 8:
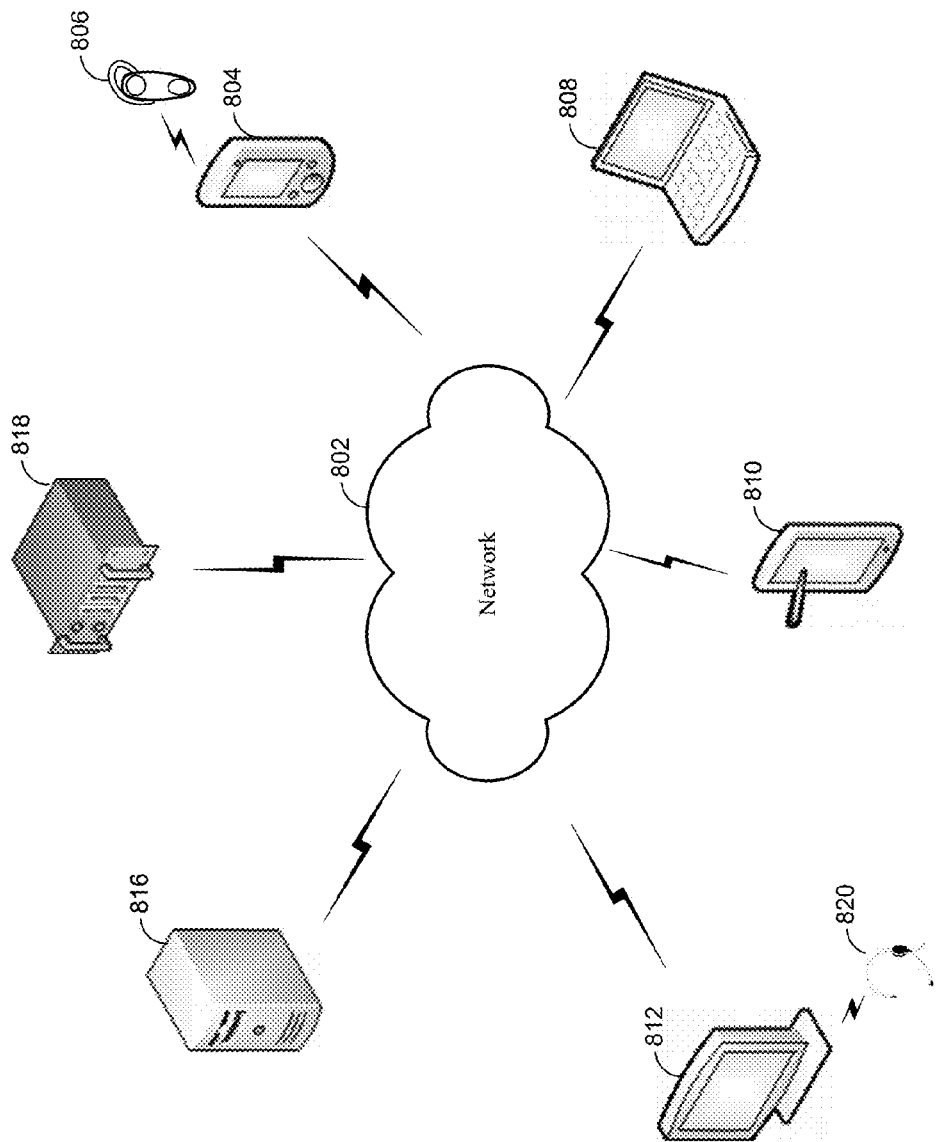
FIG. 8 illustrates a computer network for use with distributed speech recognition according to one aspect of the present disclosure.

As illustrated in FIG. 3, the ASR device 302 may include an ASR network interface (not shown) for interfacing with the network (as illustrated in FIG. 8) and receiving speech/audio from the local device 102 and capturing spoken utterances for processing. The ASR network interface when activated, may provide connectivity over one or more wired or wireless networks. Upon its activation, the ASR network interface may receive audio from, or transmit signals to, the local device 102 over the network. The ASR device 302 may return recognition results (e.g., a transcription or response to an intelligent agent query) to the local device.

The ASR network interface may be integrated into the ASR device 302 or may be separate from the ASR device 302. The ASR device 302 may also include an address/data bus 324 for conveying data among components of the ASR device 302. Each component within the ASR device 302 may also be directly connected to other components in addition to (or instead of) being connected to other components across the bus 324. Although certain components are illustrated in FIG. 3 as directly connected, these connections are illustrative only and other components may be directly connected to each other (such as an ASR module 314 to an orchestrator/processor 308).

The ASR device 302 may include an orchestrator/processor 308 (that may in some contexts be referred to as a "controller"), that may be a central processing unit (CPU) for processing data and computer-readable instructions and a memory 310 for storing data and instructions. The memory 310 may include volatile random access memory (RAM), non-volatile read only memory (ROM), and/or other types of memory. The ASR device 302 may also include a data storage component 312, for storing data and instructions. The data storage component 312 may include one or more storage types such as magnetic storage, optical storage, solid-state storage, etc. The ASR device 302 may also be connected to removable or external memory and/or storage (such as a removable memory card, memory key drive, networked storage, etc.) through the input/output device 306. Computer instructions for processing by the orchestrator/processor 308 for operating the ASR device 302 and its various components may be executed by the orchestrator/processor 308 and stored in the memory 310, storage 312, external device, or in memory/storage included in the ASR module 314 discussed below. Alternatively, some or all of the executable instructions may be embedded in hardware or firmware in addition to or instead of software. The teachings of this disclosure may be implemented in various combinations of software, firmware, and/or hardware, for example.

In addition to the network interface, the ASR device 302 may include input/output device(s) 306. A variety of input/output device(s) may be included such as a microphone, a touch input device, keyboard, mouse, stylus or other input device. Example output devices include a visual display, tactile display, audio speakers, headphones, printer or other output device. The input/output device may also include an interface for an external peripheral device connection such as universal serial bus (USB), FireWire, Thunderbolt or other connection protocol. The input/output device may also include a network connection such as an Ethernet port, modem, etc. The input/output device may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input/output device(s) the ASR device 302 may connect to a network, such as the Internet or private network, which may include a distributed computing environment. It should be appreciated that the foregoing, and other, input/output devices may be implemented as well on the local device 102, The ASR device 302 may also include an ASR module 314, for example, for processing spoken audio data, such as into text. The ASR module 314 may identify speech and transcribe audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 314 which then interprets the utterance based on the similarity between the utterance and models known to the ASR module 314. For example, the ASR module 314 may compare the input audio data with models for sounds (e.g., speech units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model or dialog-based interactive voice response (IVR) system). Based on the considered factors and the assigned recognition score, the ASR module 314 may output speech recognition results including the most likely words recognized in the audio data. The ASR module 314 may also output speech recognition results including multiple alternative recognized words in the form of a lattice or an N-best list. Neural network models may also be used to process the ASR output. The ASR module may also be configured with an ASR decoder 322 that may be used at least in part to perform further analysis of text strings, such as by decoding or analyzing pauses between words and at the end of phrases, according to the present disclosure.

The ASR module 314 may be connected to the bus 324, input/output device(s) 306, network interface, ASR decoder 322, orchestrator/processor 308 and/or other component of the ASR device 302. Audio data sent to the ASR module 314 may come from the network interface or may be received by an input/output device, such as audio data captured by the local device 102 and sent to the ASR device 302 over the network.

The ASR module 314 may include an acoustic front end (AFE), not shown. The AFE transforms audio data into data for processing by the speech recognition engine. The speech recognition engine compares the speech recognition data with the acoustic, language, and other data models and information for recognizing the speech contained in the original audio data.

The AFE may reduce noise in the audio data and divide the digitized audio data into frames representing time intervals for which the AFE determines a set of values, called a feature vector, representing the features/qualities of the utterance portion within the frame. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. The ASR device 302 may process the output from the AFE with reference to information stored in speech storage. Alternatively, post front-end processed data (such as feature vectors) may be received by the ASR module 314 from another source besides the internal AFE. For example, another entity, such as the local device 102, may process audio data into feature vectors and transmit that information to the ASR device 302 through the input/output device(s) or ASR network interface. Feature vectors may arrive at the ASR device 302 encoded, in which case they may be decoded (for example by the decoder 322) prior to processing by the speech recognition engine. The ASR device 302 attempts to match received feature vectors to language phonemes and words as known in the speech storage. The ASR device 302 computes recognition scores for the feature vectors based on acoustic information and language information. The acoustic information is used to calculate an acoustic score representing a likelihood that the intended sound represented by a group of feature vectors match a language phoneme. The language information is used to adjust the acoustic score by considering what sounds and/or words, or pauses, are used in context with each other, thereby improving the likelihood that the ASR module outputs speech results that make sense grammatically.

The ASR device 302 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Speech recognition processing may be performed using techniques such as an N-gram model where a probability of seeing a particular next word depends on the context history of the preceding n–1 words. N-gram models may also be structured as bigram (where n=2) and trigram (where n=3) models where the probability of seeing a next word depends on the previous word (in the case of a bigram model) or on the previous two words (in the case of a trigram model).

Following ASR processing, the ASR output may be sent by the ASR module 314 to another component of the ASR device 302, such as the orchestrator/processor 308 for further processing (such as execution of a command included in the interpreted text) or to the input/output device 306 for sending to an external device. Thus speech recognition results may also include a command for ultimate execution by another application.

Figure 4:
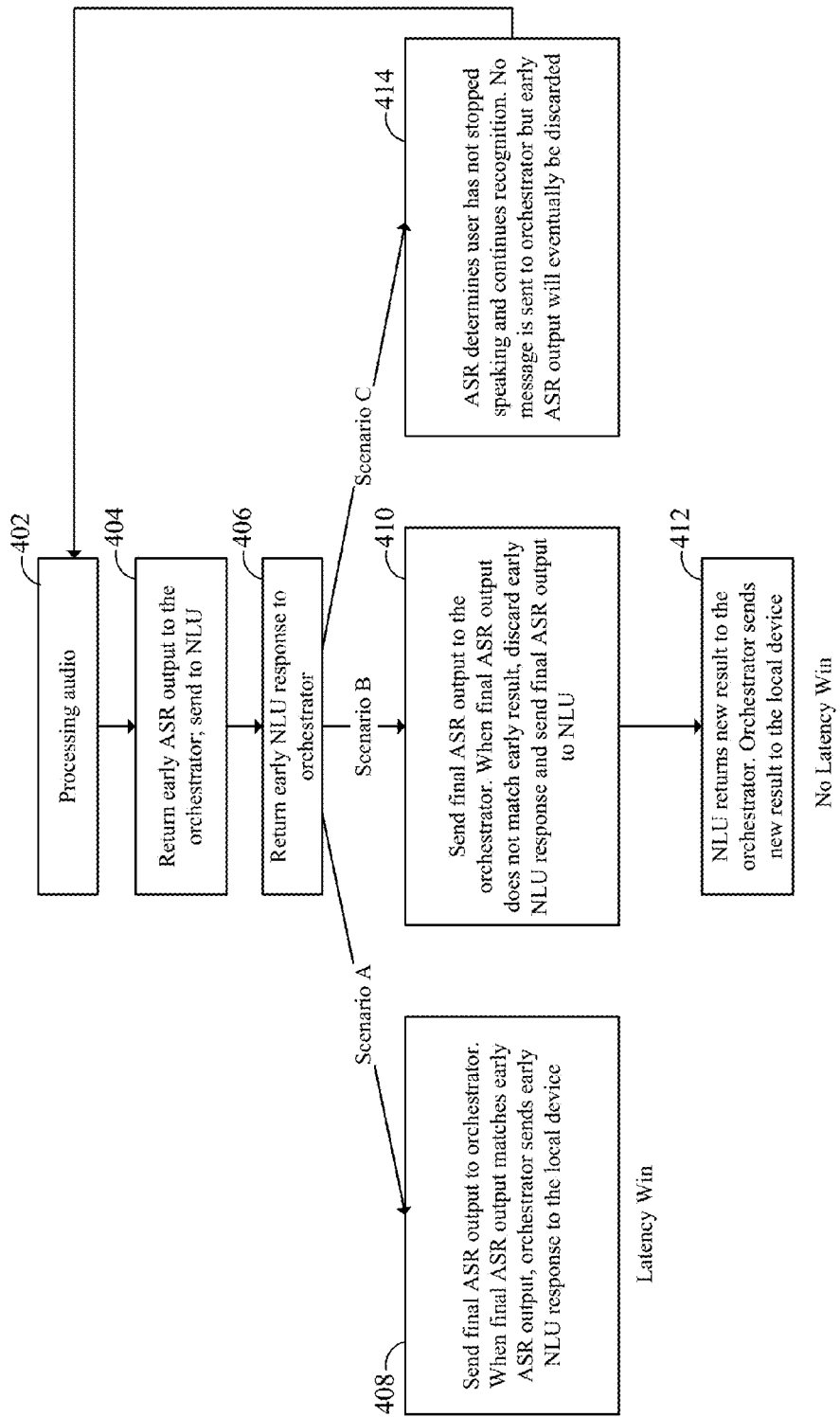
FIG. 4 is a flow diagram conceptually further illustrating enhanced endpointing according to FIG. 1 of the present disclosure.

The functionality of enhanced endpointing using speculative or predictive endpointing is illustrated in the flow chart of FIG. 4. The ASR device, as described above, begins processing audio, at 402, such as received from the local device 102. As discussed above, a speculative, or early endpoint to the input stream occurs when a certain amount of non-speech is detected, a first non-speech period. The ASR returns an early result to the orchestrator/processor at the early endpoint, at box 404. The early ASR output contains the recognized text after this first non-speech period. The recognized text from the early ASR output is further processed, such as by being sent to a natural language understanding (NLU) module to obtain an early NLU results (as at box 108 of FIG. 1). The following discussion, will use NLU processing as an example of further processing of the ASR output, but other speech processing could be used as discussed above. The NLU results may be sent to an application that determines, for example, the actions ("app response") based on the recognized speech. The NLU result is returned to the orchestrator/processor, at box 406. The early NLU result, and app response, are not immediately sent to the local device for execution, rather they are stored. At a later time, the final endpoint occurs after a second non-speech period, and the ASR module provides recognized text in the form of a "final" ASR output.

In one aspect of the present disclosure, one of three scenarios is possible, as illustrated in FIG. 4. In scenario A, box 408, the ASR sends the final result to the orchestrator/processor and it is determined, such as by a comparison or subtraction operation, that the final result and the early result are the same (or similar enough according to some established similarity metric). In this scenario the stored NLU result and/or app response is sent to the local device for execution, and there is an improvement in latency because the NLU result/app response is immediately available and sent to the local device 102. This is characterized as a "latency win."

In a second scenario, scenario B, the ASR final result is sent to the orchestrator/processor and it is determined that the early result and the final result are different, at box 410. In this scenario, the NLU-processed early ASR output and/or app result are discarded. The final ASR output is then sent to the NLU, and application, for processing. The NLU results are then generated from the final ASR output and, along with any app response therefrom, are sent on to the local device to implement action based on the recognized speech, at box 412. In this case there is no latency win because the early endpoint did not yield the appropriate recognized speech.

In a third scenario, scenario C, the ASR may realize that the speech has not ended even though the early endpoint, in terms of time since the beginning of non-speech has been reached, box 414. In this case the ASR will keep going with the speech processing. The NLU processed early results/app response will not be sent to the orchestrator/processor, but instead may be stored. When a further ASR output is sent, the stored early NLU result may be discarded. The ASR will continue to process audio/speech input 402. Further early results may be processed. At some point the end of speech will be reached and the ASR output processed, and either scenario A (latency win) or scenario B (no latency win) will occur.

Figure 5:
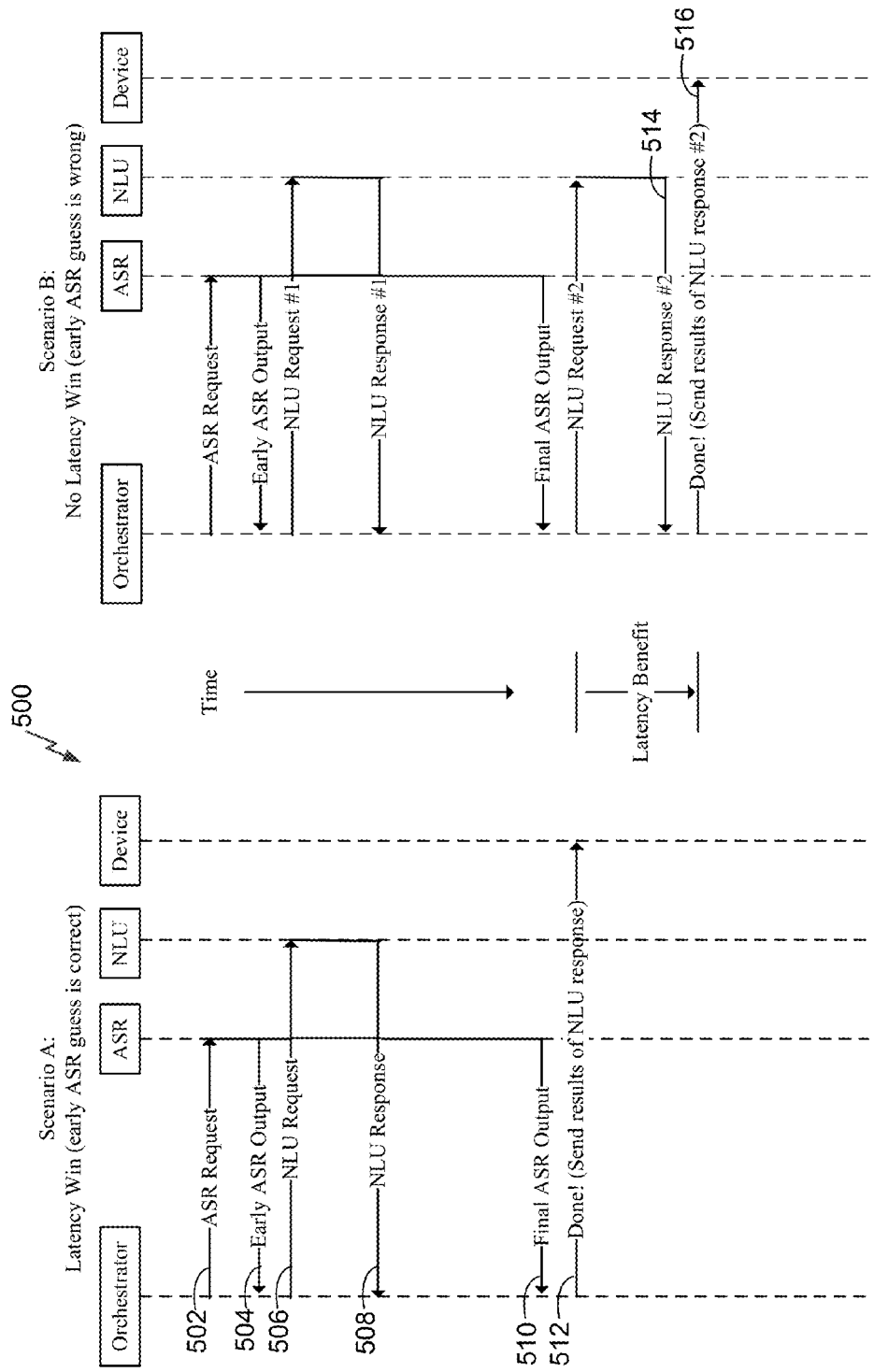
FIG. 5 is a diagram illustrating system interaction for enhanced endpointing according to FIG. 1 of the present disclosure.

FIG. 5 illustrates system interactions and timing under scenario A and scenario B as discussed above. As illustrated, under scenario A, 500, during the early or speculative/predictive interaction the orchestrator/processor makes a request to the ASR to receive early an ASR output (for example after 200 ms of non-speech), 502. Thereafter, the ASR returns the early ASR output, 504. The early ASR output goes to the NLU with an NLU request, 506, and the NLU provides the NLU results or response, 508. Upon receipt of the second or final ASR output, 510, for example after 400 ms of non-speech, if the early ASR output is the same as the final ASR output the stored NLU results are sent, 512, to the local device 102 to effect some action or be processed by an application.

As illustrated in FIG. 5, under scenario B the predictive/speculative/early endpoint results in the ASR output that is different from the final ASR output, thus there is no latency win. The interactions under this scenario exceed the time of the interactions under scenario A. Specifically, further time is required to send the final ASR output to the NLU and make a second NLU request, 514, and thereafter send the second NLU results, 515, to the local device 102 to effect some action or be processed by an application. It should be appreciated that under the scenario where the early and final ASR output differ there is no penalty in speed or accuracy, as compared with a traditional ASR system. Rather, the stored early ASR output is merely discarded and the final response is processed as it would be in the ordinary course. Advantage is to be gained by implementing the early, predictive in that if the early and final ASR outputs are the same then the user device receives the NLU results and app response earlier, reducing latency experienced by the user.

In one aspect, confirmation of the early ASR output may be provided in another manner rather than comparing the early ASR output to the later ASR output. In one aspect, the early ASR output may be provided after a first ending of speech is determined based on some endpointing technique, such as a length of non-speech in the utterance. Later, a second ending of speech is determined and if no additional speech has occurred between the first ending and the second ending, the early ASR output may be confirmed. Put another way, if a certain amount of non-speech is detected following the first ending, the early ASR output may be confirmed.

In determining that the speech stream has stopped, the ASR server 302 may use the thresholding techniques described above. In some embodiments, the ASR module 314 may implement one or more techniques to determine whether the audio input includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the ASR device may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input. The ASR device may compare the input audio data with models for sounds (e.g., speech units or phonemes) and sequences of sounds to identify words that match the sequence of sounds, and pauses, spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Based on the considered factors and the assigned recognition score, the ASR may output the most likely words recognized in the audio data for comparison against language models stored in memory 310 or storage 312. ASR output may then be sent to a downstream component, such as an NLU unit 326, for further processing.

A traditional NLU unit may include a module for named entity recognition (NER) module 328, an intent classification (IC) 330 module, as well as other components such as a processor, storage, further modules, etc.

While semantic information may typically be assigned to text during NLU processing, in one aspect of the present disclosure, one or more ASR models may incorporate semantic information, such as semantic tags, such that that speech recognition results created from these ASR models include the semantic information along with the traditional recognized text. The semantic information indicates some value related to the content of speech/resulting text. In a semantic interpretation process (which may be part of traditional NLU processing), which commonly takes places after ASR processing, semantic tagging is a process of recognizing and identifying specific important words of an ASR output and assigning a tag to those words, where the tag is a classification of the associated word. The tags may be called entities or named entities. Some words in a phrase may be considered less important, thus not considered for a named entity and may not receive a tag or may be given a catchall or default tag such as "Unknown" or "DontCare." The tagging process may also be referred to as named entity recognition (NER).

In this aspect, the semantic information and tags are built in to the models used to perform ASR processing such that the semantic information (which may be less comprehensive than tags available in a post-ASR semantic tagging process) is output with the text as a result of the ASR process. The models may rely on a variety of inputs to the model, called features, which determine how specific words in a textual input may be classified. Example features include direct textual data (i.e., the word of the text itself) as well as features which may be derived from/based on the text (such as pauses, words used to the right or left of the subject word, location of the word in a sentence structure, grammatical information such as a word's part of speech (noun, preposition, verb, etc.)).

The semantic information in the ASR output may include information regarding the likelihood that a particular utterance has ended based on the existing contents of the utterance and/or the length of time of a pause (or non-speech) following a particular word. Over time, the ASR system may refine the pause thresholds associated with tags, or wait times, to the specific patterns of pauses before ASR processing is started on an utterance for the given user. For a user that pauses frequently or for long periods, the system may adjust thresholds or wait times to be longer. For a user who speaks without many long pauses, the system may adjust all thresholds to be shorter. Early or final endpoints, or both, may be adjusted in a system according to the disclosure. Thus semantic information in the user's speech may be used to help determine the ending of an utterance, instead of basing it on non-speech audio frames only. The threshold of the number of non-speech frames may be dynamically changed based on the semantic meaning the speech that has been recognized so far. Thus, the ASR module 314 may determine a likelihood that an utterance includes a complete command and use that utterance to adjust the threshold of non-speech frames for determining the end of the utterance.

In another aspect, the ASR module 314 may determine a likelihood that an utterance includes a complete command based on the semantic content of the speech recognition results. The ASR may then assign a likelihood to the ASR output (such as associating a likelihood with a particular N-gram ASR output). An ending of the utterance may then be determined based on the likelihood. The likelihood may be determined using models available to the ASR module 314 which train the ASR module 314 on assigning the likelihood.

The models available to the ASR module 314 may be based on training data which include samples of input text and pauses and their corresponding semantic tags. For example, a number of potential utterances are illustrated in FIGS. 6A-6G. Such examples may form the basis for training data. For a command of "play songs," FIG. 6A, the word "play" may be associated with a "PlayTrigger" tag and the word "songs" may be associated with an "ClassName" tag (for "songs," for example, as opposed to "games"). The pauses, P1 and P2, may be tagged as "Non-Speech" and be associated with respective durations or numbers of non-speech frames, or time ranges, as a result of the phrase and semantics. Some pauses, such as P2 in FIG. 6A, may represent a tag for the end of a command. The end of a command may be inserted based on whether the ASR model recognizes that the preceding words have formed a complete command. During runtime the ASR module 314 in FIG. 3, receives the textual input, compares the input with its available models and as part of ASR processing, outputs tags along with the associated processed speech with each word or pause (i.e. non-speech frames).

Figure 7:
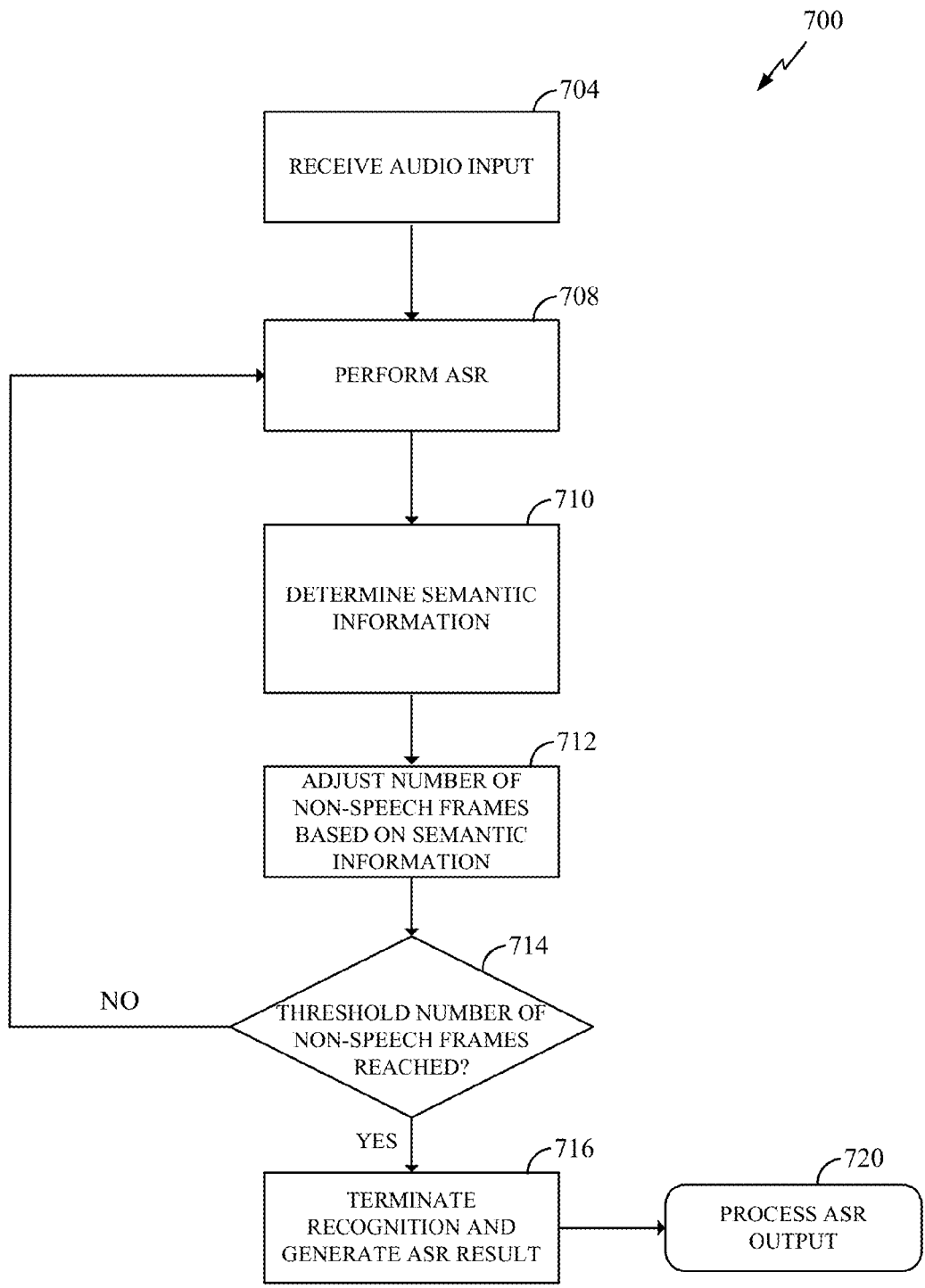
FIG. 7 is a flow diagram conceptually further illustrating enhanced endpointing according to FIG. 2 of the present disclosure.

As described above with respect to FIG. 2, and further illustrated in FIGS. 6 and 7, this semantic information in the user's speech, and represented by the semantic tags output by the ASR, may be used to help determine the end of an utterance. The amount of time after non-speech is detected until the ASR is activated to produce speech results may be dynamically adjusted based on tags in the language model that provide the semantic information appropriate to more accurately determine the end of an utterance for a given user. Based on training data, the language model may be adjusted to reflect the likelihood that the ASR should await more speech to process a complete utterance. For example, if the ASR module 314 is processing the word "songs" and it knows that the word directly following is "songs" is "by" it may be more likely to continue processing in order to get to and apply the tag "ArtistName" to the words "Michael Jackson" as in FIG. 6B. The tag for pause P5 after "Jackson" may signal the end of the phrase/command and prompt generation of the ASR output without waiting for a traditional number of silent frames.

In the examples illustrated in FIG. 6A-6G, if the ASR system has just recognized "play songs by", and it processes semantic tags according to the disclosure, it may continue to wait for a long period of non-speech when the speech is not semantically complete (e.g. FIGS. 6B and 6D are semantically complete but FIGS. 6A and 6C are not). Thus the threshold of non-speech before declaring the end of an utterance in this case should be larger in the case of FIGS. 6A and 6C, e.g. the user may be trying to remember the artist name or a particular song title.

If the ASR system has just recognized "next track", as in FIG. 6F, it may safely end the utterance immediately, because the utterance is already semantically complete and there is likely to be no more substance to the utterance. The threshold of non-speech audio frames may be very small in this case. Alternatively, instead of reducing the threshold of silent audio frames, recognition of the end of a phrase/command tag may trigger an indication to consider the utterance complete and endpoint the speech.

If the ASR system has just recognized "play something by Michael", as in FIG. 6C, it is more complicated. The user may mean "Michael", or they may be in the middle of "Michael Jackson". The threshold of non-speech should be an intermediate value.

Thus, by incorporating semantic information when determining the end of utterances, such as those illustrated in FIGS. 6A-6G, more accurate ASR outputs may be obtained as the ASR module 314 may know that it is proper to terminate early after "stop", wait a little bit more after "play songs", and wait longer after "play songs by".

FIG. 7 illustrates a process for implementing enhanced endpoint determination using semantic information to help determine the end of a speech utterance. As described above, a speech endpoint detection algorithm, 700, may decide if an utterance can be terminated based on the number of silence/non-speech audio frames, for instance the number of consecutive silence/non-speech frames. Energy based or acoustic model based voice activity detection can be used in these algorithms. The utterance will be ended when it sees a certain number of non-speech audio frames. According to one aspect of the disclosure, tags may be used in the language model to provide the semantic information needed to end the utterance appropriately. Given the training data, the language model can provide an indication of how likely (likelihood) a given decoder state should await more speech to complete an utterance. With this likelihood information, the maximum number of non-speech frames may be dynamically adjusted and the ASR may wait in current state before terminating the utterance.

As illustrated, the ASR device receives audio input, 704. As audio input is received, VAD may be used to determine if voice activity is detected. During runtime processing, the language model and sematic tags are accessed, 710, and used to determine the likelihood that the ASR should await more speech before determining the end of the utterance. Depending on the determination, the number of frames of non-speech that may be processed before the end of the utterance is established and may be adjusted, box 712. The ASR processing may determine if the threshold number of non-speech frames is reached, at box 714. If the threshold number of frames is not reached then ASR processing continues, at box 708. If the number of non-speech frames is reached then the ASR processing is terminated and an ASR output is generated, at box 716. The ASR output is then processed by a downstream component (such as an NLU component), at box 720.

Multiple devices, including multiple local devices 102 and ASR devices 302 may be connected over a network, as illustrated in FIG. 8. Network 802 may include a local or private network or may include a wide network such as the internet. Devices may be connected to the network 802 through either wired or wireless connections. For example, a wireless local device 102 may be connected to the network 802 through a wireless service provider. Other devices, such as computer 812, may connect to the network 802 through a wired connection. Other devices, such as laptop 808 or tablet computer 810 may be capable of connection to the network 802 using various connection methods including through a wireless service provider, over a WiFi connection, or the like. Networked devices may input spoken audio through a number of audio input devices including through a headset 806 or 814. Audio input devices may be connected to networked devices either through a wired or wireless connection. Networked devices may also include embedded audio input devices, such as an internal microphone (not shown) in the laptop 808, wireless device 102 or tablet computer 810.

In certain ASR system configurations, one device may capture an audio signal and another device may perform the ASR processing. For example, audio input to the headset 606 may be captured by local device 102 and sent over the network 802 to computer 816 or illustrated server 818 for processing. Or, as described above, local device 102 may partially process the audio signal before sending it over the network 802 to the server for further processing. Because ASR processing may involve significant computational resources, in terms of both storage and processing power, such split configurations may be employed where the device capturing the audio has lower processing capabilities than a remote (e.g. server) device and higher quality ASR outputs are desired. The audio capture may occur near a user and the captured audio signal sent to another, remote, device for processing.

Thus the teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The ASR device 302 may also be a component of other devices or systems that may provide speech recognition functionality such as automated teller machines (ATMs), kiosks, home appliances (such as refrigerators, ovens, etc.), vehicles (such as cars, busses, motorcycles, etc.), and/or exercise equipment, for example.

Additionally, it should be noted that in some embodiments, the functionality of the client or local device 102 and/or speech recognition server or ASR device 302 may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. One or more of the computing devices of the hosted computing environment may include enhanced endpointing as discussed above.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the ASR techniques described herein may be applied to many different languages, based on the language information stored in the speech storage. Further, although "speech" or "voice" activity are discussed, it should be appreciated that the system and methods of the disclosure may be implemented such that speech or voice activity may include any activity that is not silence or background noise, for example speech/voice activity may include music.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), graphics processing unit or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise. Depending on the embodiment, certain acts, events, or functions of any of the routines or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method for reducing latency in speech recognition, the method comprising:
   receiving audio input data representing an utterance;
   performing automatic speech recognition (ASR) processing on the audio input data to generate ASR output;
   determining a first ending to the utterance in the audio input data at a first time corresponding to non-speech detected in the audio input data;
   determining a first portion of the ASR output, the first portion corresponding to the audio input data up to the first ending;
   providing the first portion of the ASR output to a natural language understanding (NLU) module to obtain a first NLU result;
   storing the first NLU result;
   determining a second ending to the user's speech in the audio input data at a second time after the first time;
   determining a second portion of the ASR output, the second portion corresponding to the audio input data up to the second ending;
   comparing the first portion to the second portion; and:
   (1) if the first portion is the same as the second portion, initiating a first action to be executed on a first device, the first action based on the first NLU result, and
   (2) if the first portion is not the same as the second portion:
      discarding the first NLU result,
      providing the second ASR output to the NLU module to obtain a second NLU result, and
      initiating a second action to be executed on the first device, the second action based on the second NLU result.

2. The method of claim 1, further comprising sending one of the first NLU result or the second NLU result to the first device for initiating the first action or initiating the second action.

3. The method of claim 1, further comprising determining the first ending using first semantic information in the ASR output.

4. The method of claim 3, further comprising determining, based at least in part on the first semantic information, adjusting a threshold for a length of non-speech sufficient to determine the first ending.

5. A system comprising:
at least one processor coupled to a memory, the memory including instructions operable to be executed by the at least one processor to perform a set of actions, configuring the at least one processor:
to receive audio input data, including a speech utterance;
to perform automatic speech recognition (ASR) processing on the audio input data to generate ASR output;
to determine a first ending of the utterance in the audio input data;
to generate a first speech recognition output including a first portion of the ASR output that corresponds to the audio input data from a beginning of the audio input data up to the first ending;
to process the first speech recognition output to obtain a first speech processing result; and:
 (1) if the audio input data after the first ending does not include speech, to initiate a first action to be executed on a first device based at least in part on the first speech processing result, and
 (2) if the audio input data after the first ending includes speech:
  to discard the first speech processing result,
  to determine a second ending of the utterance in the audio input data after the first ending,
  to generate a second speech recognition output including a second portion of the ASR output that corresponds to the audio input data from the beginning of the audio input data up to the second ending,
  to process the second speech recognition output to obtain a second speech processing result, and
  to initiate a second action that is different from the first action to be executed on the first device based at least in part on the second speech processing result.

6. The system of claim 5, wherein the first speech processing result comprises a natural language processing result.

7. The system of claim 5, wherein the at least one processor is further configured to determine if the audio input data after the first ending includes speech by:
determining the second ending of the utterance in the audio input data;
generating the second speech recognition output; and
comparing the first speech recognition output to the second speech recognition output.

8. The system of claim 5, wherein the at least one processor is further configured to determine if the audio input data after the first ending does not include speech by:
detecting a period of non-speech following the first ending; and
comparing the period of non-speech to a threshold.

9. The system of claim 5, wherein the at least one processor is further configured to initiate the first action on the first device.

10. The system of claim 5, wherein the at least one processor is further configured to determine the first ending based at least in part on first semantic information.

11. The system of claim 10, wherein the at least one processor is further configured to determine, based at least in part on the first semantic information, a threshold for a length of non-speech sufficient to determine the first ending.

12. A computer-implemented method comprising:
receiving audio input data including speech;
performing automatic speech recognition (ASR) processing on the audio input data to obtain a speech recognition output;
determining, based at least in part on the speech recognition output, a likelihood that the speech recognition output includes a complete user command;
determining, based at least in part on the likelihood, a threshold length of non-speech that is processed before indicating an ending of the speech;
determining an ending to the speech at a time after the threshold length of non-speech is detected in the audio input data; and
after determining the ending, initiating an action to be executed on a first device based at least in part on the speech recognition output and the ending.

13. The computer-implemented method of claim 12, further comprising performing further processing on the speech recognition output, wherein outputting the audio output data is further based at least in part on the further processing.

14. The computer-implemented method of claim 13, wherein the further processing comprises natural language processing.

15. The computer-implemented method of claim 12, wherein the speech recognition output includes semantic tags and the likelihood is further determined based at least in part on the semantic tags.

16. A system, comprising:
at least one processor coupled to a memory, the memory including instructions operable to be executed by the at least one processor to perform a set of actions, configuring the at least one processor:
to receive audio input data including speech;
to perform automatic speech recognition (ASR) processing on the audio input data to obtain a speech recognition output;
to determine, based at least in part on the speech recognition output, a likelihood that the speech recognition output includes a complete user command;
to determine, based at least in part on the likelihood, a threshold length of non-speech that is processed before indicating an ending of the speech;
to determine an ending of an utterance in the audio input data after the threshold length of non-speech is detected in the audio input data; and
to, after determining the ending, initiate an action to be executed on a first device based at least in part on the speech recognition output and the ending.

17. The system of claim 16, wherein the speech recognition output includes semantic information and the at least one processor is configured to determine further based at least in part the semantic information.

18. The system of claim 16, wherein the at least one processor is further configured to perform natural language processing on the speech following the determining of the ending.

19. The system of claim 18, wherein the at least one processor is further configured to initiate the action based at least in part on the natural language processing.

20. The system of claim 18, wherein the speech recognition output comprises at least one N-gram, the at least one N-gram comprising a score representing a likelihood that the at least one N-gram includes a complete user command.

21. The system of claim 16, wherein the at least one processor is further configured:
- to determine a first ending of the speech in the audio input data;
- to determine a first portion of the speech recognition output corresponding to the audio input data up to the first ending;
- to determine a second ending of the speech in the audio input data;
- to determine a second portion of the speech recognition output corresponding to the audio input data up to the second ending;
- to determine that the first portion is the same as the second portion; and
- to initiate the action based at least in part on the first portion.

22. The system of claim 16, wherein the at least one processor is further configured:
- to determine a first ending of the speech in the audio input data;
- to determine a first portion of the speech recognition output corresponding to the audio input data up to the first ending;
- to determine a second ending of the speech in the audio input data;
- to determine a second portion of the speech recognition output corresponding to the audio input data up to the second ending;
- to determine that the first portion is not the same as the second portion;
- to perform natural language processing on the second portion; and
- to initiate the action based at least in part on the natural language processing.

* * * * *